US010860492B2

(12) United States Patent
Du et al.

(10) Patent No.: US 10,860,492 B2
(45) Date of Patent: *Dec. 8, 2020

(54) RAPID SIDE-CHANNEL ACCESS TO STORAGE DEVICES

(71) Applicant: Alibaba Group Holding Limited, Grand Cayman (KY)

(72) Inventors: Yu Du, Hangzhou (CN); Ping Zhou, San Mateo, CA (US); Shu Li, Santa Clara, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,050

(22) Filed: Jan. 13, 2020

(65) Prior Publication Data

US 2020/0151107 A1    May 14, 2020

Related U.S. Application Data

(63) Continuation of application No. 15/976,034, filed on May 10, 2018, now Pat. No. 10,552,332.

(51) Int. Cl.
   *G06F 12/0882*   (2016.01)
   *G06F 12/06*     (2006.01)
   *G06F 13/16*     (2006.01)
   *G06F 3/06*      (2006.01)

(52) U.S. Cl.
   CPC ...... *G06F 12/0882* (2013.01); *G06F 12/0638* (2013.01); *G06F 13/1663* (2013.01); *G06F 3/0659* (2013.01); *G06F 2212/2022* (2013.01)

(58) Field of Classification Search
   None
   See application file for complete search history.

(56) References Cited

U.S. PATENT DOCUMENTS

| | | | |
|---|---|---|---|
| 4,400,794 A | 8/1983 | Koos | |
| 5,936,640 A | 8/1999 | Horan et al. | |
| 6,711,673 B1 | 3/2004 | Mitchell et al. | |
| 7,716,035 B2 | 5/2010 | Oshins et al. | |
| 7,895,404 B2 | 2/2011 | Batifoulier et al. | |
| 8,780,679 B2 | 7/2014 | Ngwe et al. | |
| 9,122,594 B2 | 9/2015 | Mahalingam et al. | |
| 9,229,859 B2 | 1/2016 | Cowan et al. | |

(Continued)

OTHER PUBLICATIONS

Qinsong Wei et al., Extending SSD Lifetime with Persistent In-memory Metadata Management, 2016 IEEE International Conference on Cluster Computing, pp. 308-311 (2016).

*Primary Examiner* — Ryan Bertram
*Assistant Examiner* — Edmund H Kwong
(74) *Attorney, Agent, or Firm* — James J. DeCarlo; Greenberg Traurig, LLP (57) ABSTRACT

Disclosed are systems, methods, and apparatuses for providing a high-speed data path to storage devices. In one embodiment, a method is disclosed comprising receiving, by the processor, a data access command, the data access command specifying a location in memory to access data; issuing, by the processor, the data access command to the storage device via a first datapath, the first datapath comprising a non-block datapath; and accessing, by the processor, the non-volatile storage component through the first datapath and the memory, wherein the non-volatile storage component of the storage device is mapped to memory accessible by the processor.

20 Claims, 9 Drawing Sheets

(56) References Cited

U.S. PATENT DOCUMENTS

| | | |
|---|---|---|
| 9,612,860 B2 | 4/2017 | Bacher et al. |
| 9,727,359 B2 | 8/2017 | Tsirkin |
| 9,734,115 B2 | 8/2017 | Lee et al. |
| 9,804,988 B1 | 10/2017 | Ayoub et al. |
| 2008/0091888 A1 | 4/2008 | Sandy |
| 2012/0159040 A1 | 6/2012 | Parikh et al. |
| 2014/0006659 A1 | 1/2014 | Foong et al. |
| 2017/0177541 A1 | 6/2017 | Berman et al. |

RAPID SIDE-CHANNEL ACCESS TO STORAGE DEVICES

CROSS-REFERENCE TO RELATED APPLICATIONS

This application is a continuation of U.S. patent application Ser. No. 15/976,034, filed May 10, 2018, the disclosure of which is incorporated by reference in its entirety.

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments relate to storage devices and, specifically, to systems, devices, and methods for improving latency of critical data transfers to and from storage devices.

Traditionally, storage devices employed block-based data paths and file access mechanisms. Data written to, and read from, storage devices pass through multiple layers of processing to convert a system call (e.g., a file path-based request) to a block-based command processible by the storage device. In essence, these layers translate application-layer reads/writes to block-based reads/writes understandable by the underlying storage fabric (e.g., NAND Flash).

Block-based access to storage devices provides advantages of scale. Data can be read/written in larger blocks versus bit or byte-level access. Thus, larger data items can be written in a smaller number of blocks. However, the use of block-based file access patterns negatively impacts alternative input/output (I/O) patterns.

In many devices, metadata is read/written in addition to actual data. This metadata may comprise, for example, journaling or log data to be written to the storage device. This metadata is usually small, significantly smaller than the actual data. Often, this metadata is also on the critical path of execution for a file access. That is, the metadata must be processed prior to reading/writing the actual data.

Current devices that utilize block-based processing, subject these small metadata accesses to the same block-based processing as all data. Thus the metadata is processed by multiple layers of the client devices file-handling software. This additional processing can add significant time to the latency of the request. Additionally, the additional processing is often unnecessary and unsuitable for random access reads/writes. For example, block-processing results in an approximately 10 microsecond latency time while the latency of a PCI bus is approximately 1 microsecond. When incurring this latency for critical path metadata access, the entire file access is significantly impacted as the file access must await the results of the metadata access.

Thus, there exists a need in current systems to improve the latency associated with critical path I/O such as metadata accesses.

BRIEF SUMMARY

The disclosed embodiments solve these and other problems by establishing a side-channel datapath to allow for rapid reads/writes while preserving traditional block-based I/O channels, for example by providing a high-speed data channel to, for example, PCI and NVMe-based storage devices.

In one embodiment, a method is disclosed comprising mapping, by a processor, a non-volatile storage component of a storage device to memory accessible by the processor; receiving, by the processor, a data access command, the data access command specifying a location in memory to access data; issuing, by the processor, the data access command to the storage device via a first datapath, the first datapath comprising a non-block datapath; and accessing, by the processor, the non-volatile storage component through the first datapath and the memory.

In another embodiment, a system is disclosed comprising a storage device, the storage device including a non-volatile storage component; a processor; a memory for tangibly storing thereon program logic for execution by the processor, the stored program logic comprising: logic, executed by the processor, for mapping the non-volatile storage component to the host memory; logic, executed by the processor, for receiving a data access command, the data access command specifying a location in host memory to access data; logic, executed by the processor, for issuing the data access command to the storage device via a first datapath, the first datapath comprising a non-block datapath; and logic, executed by the processor, for accessing the non-volatile storage component through the first datapath and the memory.

As described above, existing solutions use a block-based data channel for all data accesses between storage devices and host devices. The use of block-based channels for smaller data accesses (e.g., metadata reads/writes, journaling, caching, etc.) is inefficient and blocks the overall I/O of the storage device. The disclosed embodiments describe a technical solution to this problem by introducing a high throughput, memory-mapped datapath that allows for rapid access to a non-volatile storage device located in the storage device controller (e.g., existing DRAM or dedicated SCM). The disclosed embodiments result in a datapath having a significantly faster datapath for critical requests, improving the throughput of these requests from ten microseconds to approximately one microsecond.

BRIEF DESCRIPTION OF THE DRAWINGS

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Figure 1:
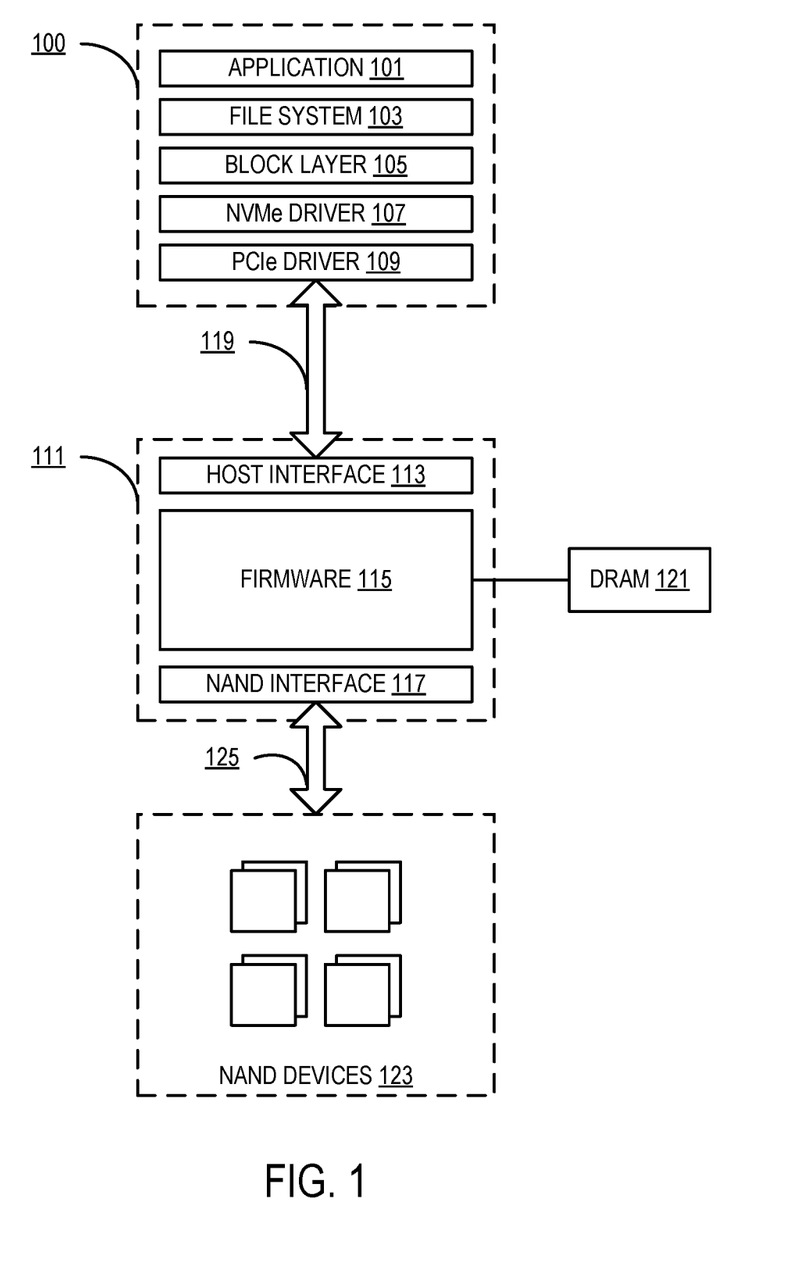
FIG. 1 is a block diagram illustrating a computing system according to some embodiment of the disclosure.

FIG. 1 is a block diagram illustrating a computing system according to some embodiment of the disclosure.

In the illustrated embodiment, an application (101) reads, writes, and modifies data stored on NAND devices (123). Access to NAND devices (123) is mediated by a controller (111) and the requests between NAND devices (123) and application (101) are processed by various layers (103, 105, 107, 109) of an operating system installed on a device (100).

Application (101) comprises any application running on device (100). For example, application (101) may comprise a user-level application (e.g., a web browser, database, word processor, etc.). Alternatively, or in conjunction with the foregoing, application (101) may comprise a system-level application (e.g., a utility application, a shell, etc.). In general, application (101) comprises any software application that reads, writes, or modifies data stored in NAND devices (123).

An application (101) may access data in the NAND devices (123) by issuing system calls provided by an operating system of the device (100). For example, in a LINUX environment, the application (101) may issue CLOSE, CREAT, OPEN, MKDIR, LINK, CHOWN, and various other system calls to operate on filesystem data. The specific system calls used are not intended to be limited and any system calls on any operating system may be called by application (101).

A filesystem (103) receives the system calls issued by application (101). The filesystem (103) may comprise a standard filesystem (e.g., ext3) or other filesystem (e.g., a FUSE-based filesystem) capable of handling system calls for a given file. As known in the art, the filesystem may be dynamically loaded based on the underlying file being accessed or the partition/drive being accessed. The system call includes a payload specific to the type of system call (e.g., a filename and data to be written). The filesystem (103) performs various operations to handle the system call.

After processing the system call, the filesystem (103) forwards the data to a block layer (105). The block layer (105) is an abstraction over various block-based devices supported by the system. While the block layer (105) may perform various functions (e.g., scheduling), one primary function of the block layer (105) is to convert the bitstream from the system call into block-level commands appropriate for the underlying storage device.

The block layer (105) forwards the block data to an NVMe driver (107). Other drivers may be used in place of NVMe, and the NVMe driver (107) is used primarily as an example of a bus protocol. The NVMe driver (107) or similar driver converts the block-level commands into commands conforming to the NVMe protocol (or suitable alternative protocol). For example, the NVMe driver (107) may place the various blocks into one or more deep queues.

Finally, the NVMe-formatted data is sent to the PCIe (Peripheral Component Interconnect Express) driver (109) which performs a final conversion of the data in accordance with the PCIe protocol. In other embodiments, PCI (Peripheral Component Interconnect), PCI-X, or other bus protocols may be used. After PCIe-formatting, the device (100) transmits the data over a bus (119) to the storage controller (111). In one embodiment, the bus (119) comprises an NVMe bus, while other busses may be selected based on the protocols used by the system.

Controller (111) receives the NVMe blocks via host interface (113). In one embodiment, host interface (113) is configured to process PCIe packets and extract the underlying NVMe blocks from the PCIe packets. Firmware (115) is used to process the unwrapped packets in accordance with the NVMe protocol (or similar protocol). In one embodiment, the firmware (115) extracts a logical block address (LBA) from the NVMe block and converts it to a physical block address (PBA). This conversion is facilitated by DRAM (121) stored locally with the controller (111). The DRAM (121) stores a mapping of LBAs to PBAs and thus is used to convert the received LBA to a PBA of one of the NAND devices (123). The firmware then converts the LBA-based command to a PBA-based command and issues the command to the NAND devices (123) via the NAND interface (117) and channel (125). The NAND interface (117) processes the PBA-based command and generates the NAND signaling required by NAND devices (123) to access the underlying PBA.

NAND devices (123) comprise one or more NAND packages, each package comprising a plurality of blocks, each block comprising a plurality of pages. In some embodiments, other non-volatile memory (NVM) may be used in place of NAND memory.

When retrieving data, the aforementioned process is executed in reverse and specific details are not included again for the sake of clarity. NAND devices (123) return data at PBAs to NAND interface (117). The NAND interface (117) processes and forwards the data to firmware (115). In response, the firmware (115) converts the PBA of the data to an LBA using DRAM (121) and transmits the response to host interface (113). In one embodiment, host interface (113) reformats the data according to the protocols used by the system (e.g., PCIe and NVMe) and transmits the data over the bus (119) to the device (100). The device (100) processes the PCIe packets using PCIe driver (109) and then processes the resulting packets using the NVMe driver (107). The resulting data is returned to the block layer (105) which performs block operations on the returned data and transmits the data to the filesystem (103) which returns the appropriate data in response to a system call issued by application (101).

As can be seen, all of the aforementioned operations are block-based. A block is a fixed size of data utilize by the system. When operating in a block-based mode, the size, and type of the underlying data are not considered when determining the size of the block, as a standard block size is used. Thus, even if the data to be read or to be written is small, an entire block is allocated and processed by the system through each layer of the system. As one example, metadata read and writes generally comprise small, random access requests to the underlying storage device. The overhead involved in block-processing these types of requests inherently slows down the response time of the system. Additionally, metadata access is often on the "critical path" of execution. That is, access to metadata frequently results in blocking the operations on underlying data associated with the metadata. Moreover, the amount of processing employed by the various layers of a device (100) adds significant processing time to each storage operation (e.g., in the 10s of microseconds). This processing time is incurred due to the overhead of block operations (layers 103 and 105) as well as NVMe (layer 107) processing. In contrast, the standalone PCIe processing overhead is around 1 microsecond. Thus, manipulating metadata using a block-based interface results in a significant slowdown of the entire system.

Various techniques have been proposed to remedy this deficiency. For example, recent NVMe revisions have added a controller memory buffer (CMB) feature that exposes internal buffers of storage devices to the device (100) address space. The device (100) can then access the CMB as a memory-mapped location. However, the CMB is primarily designed to accelerate NVMe command processing and has several limitations. First, the size of the CMB is significantly small as most of the DRAM (121) is used to map LBAs to PBAs. Second, the CMB is a volatile memory device (e.g., DRAM or SRAM) and thus loses all data during power loss or cycling. These two features, while useful for command processing, make the CMB unsuitable for metadata access or storage.

Figure 2:
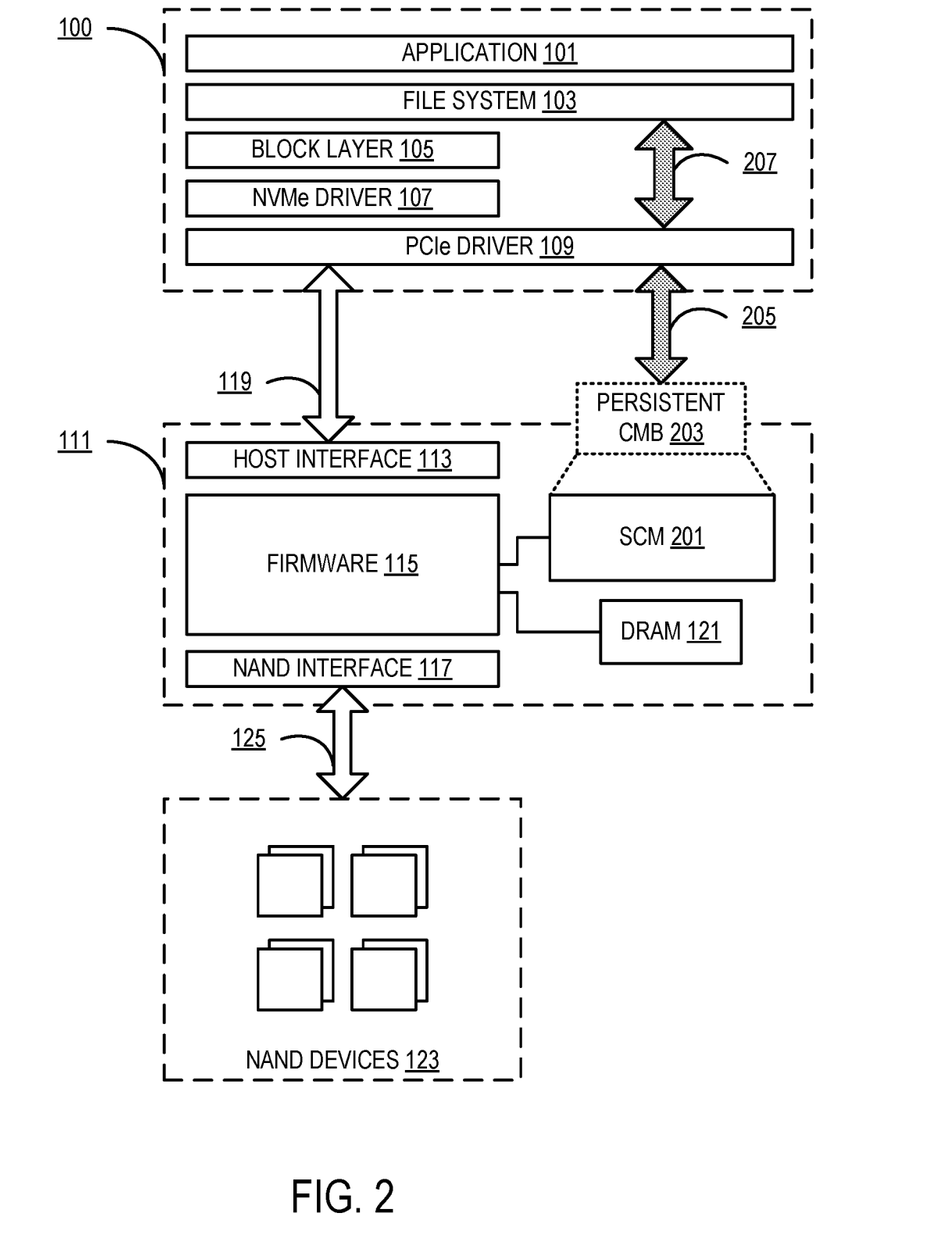
FIG. 2 is a block diagram illustrating a computing system with an enhanced metadata datapath according to some embodiments of the disclosure.

FIG. 2 is a block diagram illustrating a computing system with an enhanced metadata datapath according to some embodiments of the disclosure.

In the illustrated embodiment, various components (e.g., 100, 101, 103, 105, 107, 109, 111, 113, 115, 117, 119, 121, and 123) may perform similar operations as those described in FIG. 1 and the description of those functions is incorporated by reference. Specifically, the system illustrated in FIG. 2 may perform block-based transfer of data to and from device (100) and NAND devices (123) (e.g., via NVMe bus (119)). However, the illustrated embodiment additionally provides a streamlined metadata datapath and mode of operating the same.

In the illustrated embodiment, the controller (111) includes an additional storage class memory (SCM) device (201). The SCM (201) may comprise a phase change memory (PCM). PCM is a non-volatile memory type that uses different physical phases to represent data. Alternatively, or in conjunction with the foregoing, the SCM (201) may comprise a resistive random-access memory (ReRAM). ReRAM is a non-volatile memory type that use different resistances to represent data. Alternatively, or in conjunction with the foregoing, the SCM (201) may comprise a spin-transfer torque RAM (STT-RAM). STT-RAM is a type of non-volatile memory that uses different magnetic orientations to represent data. Other types of memory may be used in the SCM (201). In one embodiment, the type of memory only must support byte-addressing, low latency, large capacities, and non-volatility.

In the illustrated embodiment, SCM (201) is embedded within the controller (111). In one embodiment, the SCM (201) may be mounted to a board of the controller and communicatively coupled to the firmware (115). In the illustrated embodiment, the SCM (201) is included on the controller in addition to DRAM (121).

The SCM (201) is exposed to the client system via the persistent CMB (203) of the controller (111). In one embodiment, the number of CMBs used may vary based on the implementation. In general, a CMB is a PCIe base address register (BAR), or region within a BAR that is used to store data associated with an NVMe block commands. In one embodiment, the CMB is directly mapped to a memory location of the device (100). Thus, the client (100) can read and write to the CMB via direct memory access.

In traditional devices, the CMB is mapped to a region of DRAM and is used primarily for command processing. However, in the illustrated embodiment, the CMB is mapped to SCM (201) and not to DRAM (121). Thus, the controller exposes the SCM (201) directly to the device (100) via an assigned memory location on the client device. Since the SCM (201) is persistent, by mapping the SCM (201) to the memory of the device (100) via the CMB (203), the device (100) can access the SCM (201) as external persistent memory. Additionally, since the SCM (201) is independent from DRAM (121), the SCM (201) can be sized according to needs of the controller and can be sized to store as much, or as little data, as determined.

As illustrated, data to and from the SCM (201) uses a direct memory access (DMA) datapath (205, 207). In the illustrated embodiment, data is written by an application (101) to a memory-mapped file (e.g., using mmap on a LINUX system). The filesystem (103) maps the file to the SMC (201) via the PCIe driver (205). Thus, when writing to the memory-mapped file, metadata can be transferred directly to the SCM (201) without accessing the block layer (105) and NVMe driver (107), significantly reducing the latency. In one embodiment, the SCM (201) is exposed to the application (101) via a predefined memory-mapped file that may be accessed by the application (101). Notably, as illustrated, the application (101) may still issue block-based commands for non-metadata operations.

Figure 3:
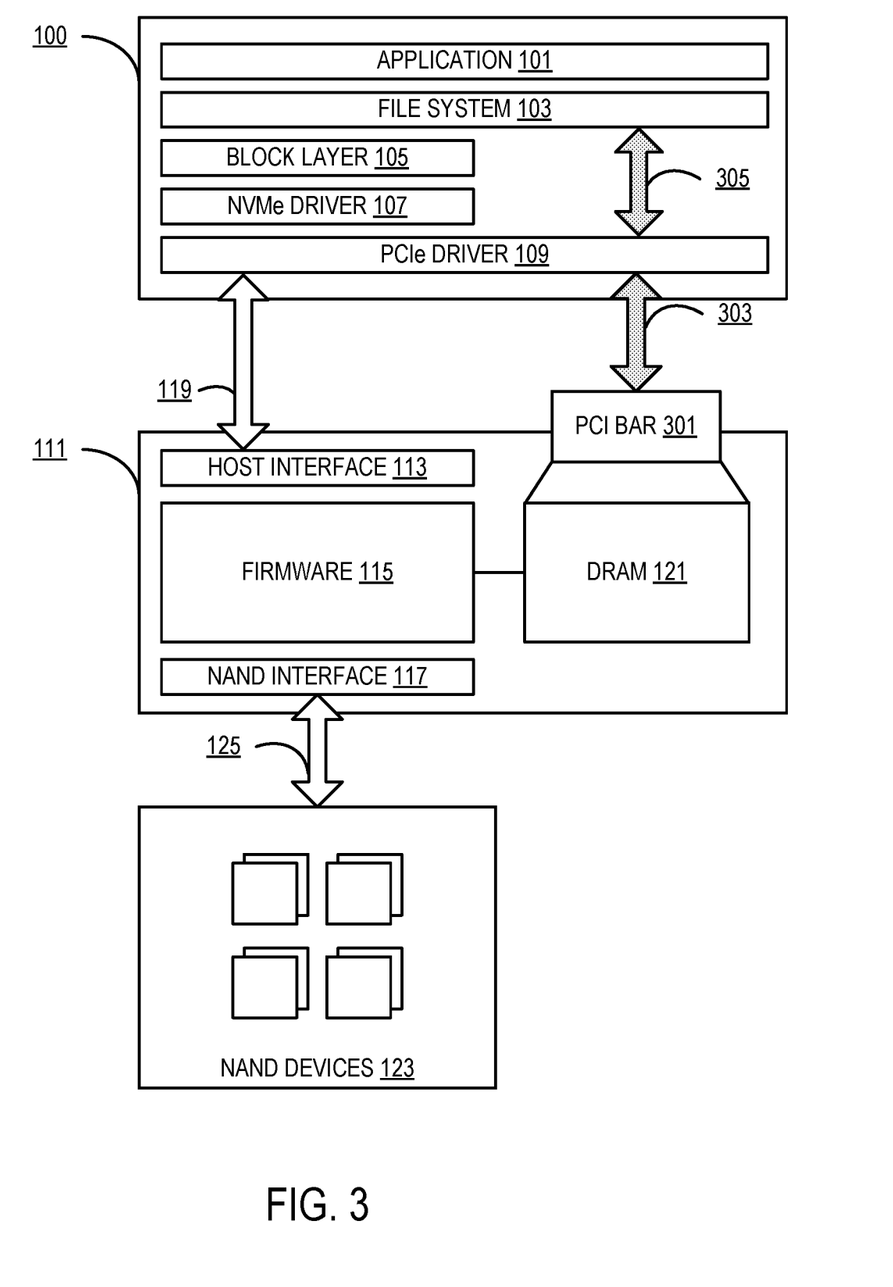
FIG. 3 is a block diagram illustrating a computing system with an enhanced metadata datapath according to some embodiments of the disclosure.

FIG. 3 is a block diagram illustrating a computing system with an enhanced metadata datapath according to some embodiments of the disclosure.

In the illustrated embodiment, various components (e.g., 100, 101, 103, 105, 107, 109, 111, 113, 115, 117, 119, 121, and 123) may perform similar operations as those described in FIG. 1 and the description of those functions is incorporated by reference.

In the illustrated embodiment, the controller (111) includes one or more PCI BARs. PCI BARs are used to address a PCI device implementing the controller. A given BAR must be enabled by being mapped into the I/O port address space or memory-mapped address space of the device (100). Host software on device (100) programs the BARs of the controller (111) to inform the PCI device of its address mapping by writing configuration commands to the controller (111). Each PCI device may have six BARs, each comprising a 32-bit address. Alternatively, or in conjunction with the foregoing, the BARs may comprise three 64-bit addresses. If the device has memory-mapped space (e.g. internal DRAM) it can be mapped to host address space so that host software can access the device with memory load/store operations.

In the illustrated embodiment, a portion of DRAM (121) is assigned to a PCI BAR (301). Thus, when the system maps the PCI BAR window into its address space, the host can use BAR (301) as a byte-addressable read/write window. Using this BAR (301), application (101) can access data through two interfaces. In a first interface, the application (101) accesses the NAND devices (123) through the standard block-based NVMe interface (e.g., datapath 119). In a second interface, the application (101) accesses the DRAM (121) directly using the "memory mode" through byte-addressable PCI BAR (301) (e.g., via database 303, 305). With this hybrid design, the application (101) can choose the optimal interface according to its I/O pattern. For example, high-priority or latency-sensitive requests may be served through BAR window (301), while low-priority or throughput-oriented requests may be served through block-based NVMe bus (119).

As described above, DRAM (121) is utilized by the controller (111) to store an LBA-to-PBA mapping. Thus, a portion of the DRAM (121) may be isolated to perform LBA/PBA matching. The remaining portion of DRAM (121) may be utilized as a cache or buffer. Sizing of the cache or buffer may be enforced by firmware (115) via the PCI BAR (301). That is, the PCI BAR (301) may point to the first free memory location in DRAM (121). In some embodiments, multiple PCI BARs may be mapped to DRAM (121). In this embodiment, a first PCI BAR may be mapped to the first portion of free space in DRAM (121) while a second PCI BAR may be mapped to a DRAM (121) address midway within the free space.

In one embodiment, the BAR-mapped portion of DRAM (121) may be used as a bye addressable read cache. This cache can provide near sub-microsecond latency and significantly improve Quality-of-Service (QoS) of read requests via the datapath (303, 305). For example, reading data from a NAND channel that is actively serving program or erase command can cause a long delay. Some mechanisms like "program suspend" can mitigate this delay, but these mechanisms introduce extra complexity to firmware (115) and are dependent on NAND support. Instead, by using the BAR (301) firmware can pre-fetch hot data from a channel before issuing a program/erase command, so that conflicting read requests can be served through the BAR (301). In another embodiment, the BAR (301) allows for reading of data from an "open" block (i.e. a block that has not been fully programmed yet). Due to NAND characteristics, such read requests will suffer from longer latency caused by higher bit error rate. By caching data from open blocks in BAR (301), read requests will not be affected by such NAND limitation.

In a second embodiment, the BAR-mapped portion of DRAM (121) may be used as a byte addressable write buffer. In this embodiment, the BAR (301) is used to serve latency-sensitive requests such as write-ahead logging and journaling. In these cases, the device (100) first configures the write buffer with a certain threshold. It then appends data in the write buffer (along with LBAs, if data is not contiguous). Once data in the write buffer reaches a threshold, firmware (115) automatically "flushes" data back to NAND devices (123). Depending on the sizes of DRAM (121) and power-loss capacitors, multiple write buffers may be configured in the BAR (301), allowing multiple write streams.

Figure 4:
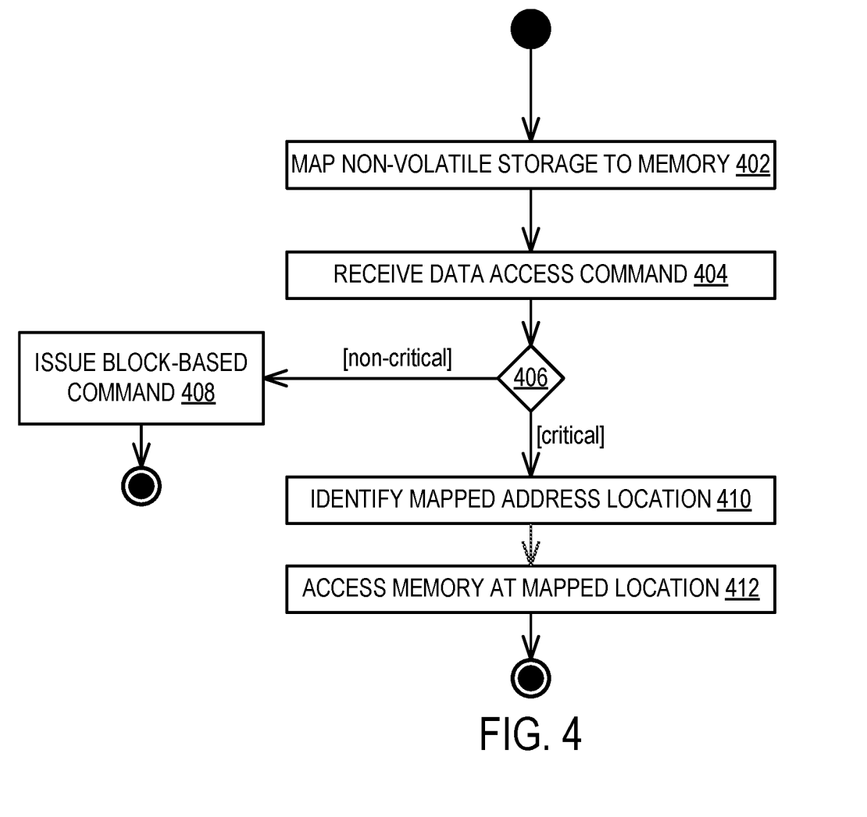
FIG. 4 is a flow diagram illustrating a method for accessing data in a storage class memory device using a memory-mapped address according to some embodiments of the disclosure.

FIG. 4 is a flow diagram illustrating a method for accessing data in a storage class memory device using a memory-mapped address according to some embodiments of the disclosure.

In step 402, the method maps a non-volatile storage device to a host memory location.

In one embodiment, the non-volatile storage device comprises a portion of DRAM located in a controller of a non-volatile storage device. In another embodiment, the non-volatile storage device comprises an SCM module installed on a controller of a storage device. In the illustrated embodiment, mapping a non-volatile storage device comprises mapping the device using a PCI BAR window of the storage device. In one embodiment, the PCI BAR window comprises a CMB window of the storage device.

In step 404, the method receives a data access command.

In one embodiment, a data access command refers to any command that reads, writes, or otherwise manipulates data on a storage device. Examples of data access commands include read, write, delete, change attributes, and other types of commands. In one embodiment, the data access command comprises a system call issued by a host application. In each embodiment, the data access command may include a filepath or filename. In some embodiments, write commands or update commands include data to written.

In step 406, the method determines if the data access command is critical or non-critical.

The method may determine whether a command is critical may be performed in various ways. In one embodiment, an operating system provides separate system calls for critical data access. In one embodiment, these separate system calls may comprise standard POSIX system calls prefixed with a defined prefix (e.g., "C OPEN" for "critical" open). In another embodiment, POSIX systems calls may be modified to include a critical flag to indicate that the call is critical.

In other embodiments, no modification to the operating system is required. Instead, one or more filepaths may be memory-mapped to critical locations of the storage device. For example, as described above, the CMB mechanism of a solid-state device (SSD) enables the mapping of a memory region to a memory-mapped storage area of the host devices memory. When initializing the storage device, the driver (e.g., PCIe driver) of the device may map a logical storage device to the CMB location. In this embodiment, in step 406 the method inspects the filepath of the data access command and automatically classifies the command as critical if the command is accessing the critical storage location mapped during initialization.

In other embodiments, the payload of the data access command may additionally be used to classify the command as critical or non-critical. For example, the method may analyze the payload of a write command and determine if the payload is lower than a pre-determined threshold. In this example, the threshold may be suitably small to ensure that only small data access payloads trigger the critical determination. Thus, by using the threshold, the method can route all smaller I/O accesses to a critical path.

In step 408, the method issues block-based command if the data access command is non-critical.

As described above, the method may proceed in converting the system call to a block-based access command. In some embodiments, this process entails passing the system call through a block layer, NVMe driver, and PCIe driver, before the command is transmitted to a controller of a storage device.

In step 410, the method identifies a mapped address location upon classifying the data access command as a critical access.

In one embodiment, the method identifies the host device memory location mapped to the CMB or BAR location of the storage device. On startup, the host device reads the BARs of the storage device to identify how many bytes should be mapped between the host device and the storage device and what type of mapping is required (e.g., memory access). The host device allocates this memory and writes to the BARs, the data written comprising the address in host memory the PCI device will respond.

In one embodiment, the method computes the mapped address based on the filepath included in the data access command as well as any offsets included the data access command. Thus, if the command requests to write 8 bytes to the mapped file at an offset of 6 bytes, the method will compute the memory address 6 bytes from the start of the mapped initial address and use this address as the mapped address location for memory writing.

In step 412, the method access local memory at the mapped location.

In one embodiment, accessing the local memory comprises issuing memory read, write, and other commands. Since the local memory addresses are mapped to the internal location within the storage device, accesses to these local memory locations are forwarded to the corresponding CMB or BAR address and, ultimately, to the underlying storage device (SCM or DRAM).

Figure 5:
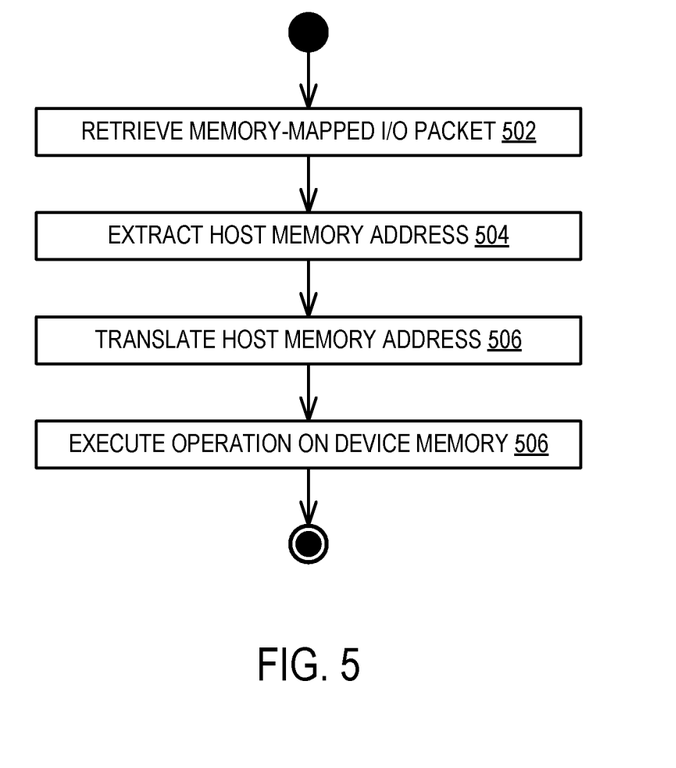
FIG. 5 is a flow diagram illustrating a method for processing storage device operations according to some embodiments of the disclosure.

FIG. 5 is a flow diagram illustrating a method for processing storage device operations according to some embodiments of the disclosure.

In step 502, the method receives a memory-mapped I/O packet.

In one embodiment, this packet comprises a PCIe packet. In the previous figure, a packet may be generated by the PCIe driver. For example, accessing a memory location in step 410 may comprise writing a value to a specific memory location. Both the physical (or virtual) system memory location and the data is encapsulated in the packet, along with additional metadata supplemented by the PCIe driver. In one embodiment, the method may additionally tag the packet as critical or non-critical (e.g., using the Tag field of the PCI TLP packet format).

In step 504, the method extracts the host address (i.e., the local memory address) from the data package and, in step 506, translates the host address into a local storage device address.

As described above, the modified storage device supports both block-based I/O access as well as memory I/O. In one embodiment, the translation processing step 506 comprises translating the host address to a memory location in an SCM storage location. In another embodiment, the translation comprises translating the host address to a memory location in the storage devices DRAM. The determination of which translation to apply may be configured based on the BAR configuration of the storage device.

In step 506, the method executes the operation on the device's memory device.

In one embodiment, the method performs reads, writes, and other operations on the SCM embedded within the device. Alternatively, the operations may comprise read, writes, and other operations to be performed on local DRAM.

Figure 6A:
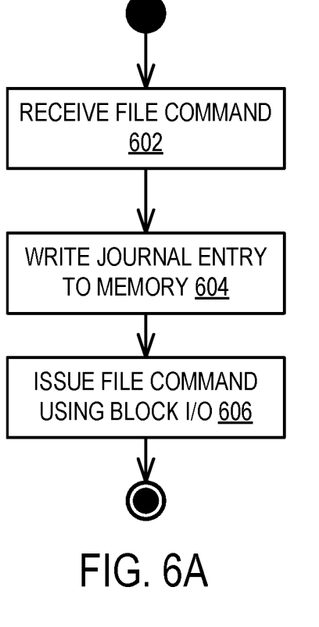
FIG. 6A is a flow diagram of a method for performing journaling by a filesystem according to some embodiments of the disclosure.

FIG. 6A is a flow diagram of a method for performing journaling by a filesystem according to some embodiments of the disclosure.

In step 602, the method receives a file access command. In one embodiment, this command may comprise any system call issued by an application. In general, the system call represents data to be read, written, or otherwise accessed by the application. In the illustrated embodiment, the data is stored on a storage device such as an SSD.

In step 604, the method writes a journal entry to a location in host memory.

In one embodiment, step 604 may be performed using memory store and load commands. As described above, a storage location on the underlying SSD is mapped (via PCI BARs) to the host memory, thus in step 604, the method reads/writes to these memory locations and transfers the journal entries to the underlying storage device (e.g., an SCM or dedicated DRAM portion of the SSD controller). The specific form of the journal entry is not intended to be limited. Indeed, the specific form of journal entries may be dependent on the underlying filesystem used by the storage device.

In step 606, the method issues the file command using block I/O.

The issuance of a block I/O command may be performed only after receiving a message that the journaling in step 604 succeeds. Since the journal entry is written using memory load/store commands, this message is returned significantly quicker than existing systems that use block I/O for all journal entry writes. As described above, the block I/O commands are processed by various layers of the host device (e.g., filesystem drivers, NVMe drivers, PCIe drivers, etc.) and subsequently executed on the underlying storage device.

Figure 6B:
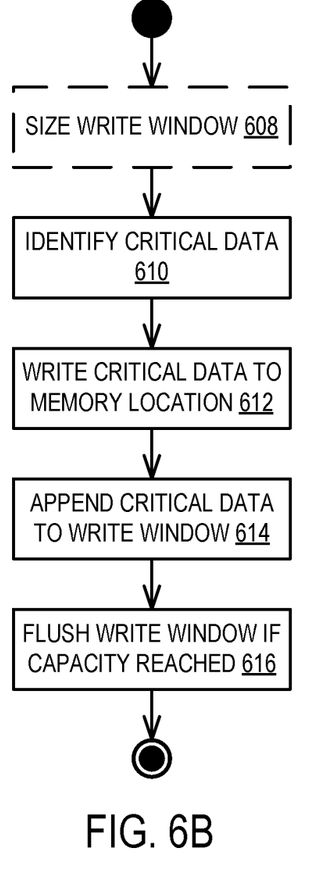
FIG. 6B is a flow diagram of a method for implementing a byte addressable write buffer in local memory of a storage device according to some embodiments of the disclosure.

FIG. 6B is a flow diagram of a method for implementing a byte addressable write buffer in local memory of a storage device according to some embodiments of the disclosure.

In step 608, host software sizes the write window.

In one embodiment, host software sizes the write window based on the size of DRAM backing the write window as described in connection with FIG. 3. Alternatively, or in conjunction with the foregoing, the method may additionally size the write window based on the power loss capacitance supplied to the DRAM and/or controller of the SSD. In one embodiment, the power loss capacitance represents the amount of charge stored by the controller/DRAM in the event of power loss. In one embodiment, this value is stored in the PCI configuration space of the storage device. The power loss capacitance is used to calculate the maximum size of the write window, the maximum size comprising the largest amount of data that can be transferred from DRAM to persistent storage while operating on the charge stored by the power loss capacitor(s). In some embodiments, a single write window may be sized. Alternatively, the method may size multiple write windows. In this embodiment, each write window may be assigned to a memory location on the host device (via PCI BARs). Thus, the method may support multiple write channels.

In step 610, the method identifies critical data

In one embodiment, the identification of critical data is performed by host application software. Details of identifying critical data are described in FIGS. 4 and 5 and the description of these Figures is included by reference herein. As one example, critical data may comprise high-value data that the application must persist as quickly as possible. As another example, critical data may comprise journaling data.

In step 612, the method writes the critical data to a memory location.

In one embodiment, writing the critical data to a memory location comprises the host application issuing a "memory store" system call and including the critical data as part of the memory store. As described above, the host memory location may be mapped to DRAM of the storage device via a PCI BAR mechanism. Thus, the memory store results in the host device transferring the critical data to the SSD via a PCIe driver (or similar driver), thus bypassing block-level processing.

In step 614, the method appends the critical data to the write window.

In one embodiment, the write window refers to a contiguous section of the DRAM used by the SSD device on the controller. In the illustrated embodiment, the write window acts as a write-append log. Thus all data is written to the last available DRAM memory location. Thus, in this embodiment, the method does not need to translate memory locations as performed in FIG. 5.

In step 616, the method flushes the write window if the window's capacity is reached.

As described above, the write window may have a fixed capacity based on, for example, the size of the DRAM and/or the power loss capacitance of the device. In one embodiment, after each append to the write window, firmware of the SSD device inspects the write window allocated in DRAM to determine if the write window is full. Alternatively, the firmware may compare the current append address to the size of the write window to determine if the write window is full.

If the write window is full, the firmware initiates a flush procedure to empty to the write window. In one embodiment, the flush procedure transfers the contents of DRAM to a persistent storage location (e.g., on a NAND Flash array). In some embodiments, the persistent storage includes a separate metadata storage area. In this embodiment, the firmware appends the entire write window to the separate metadata storage location.

Figure 6C:
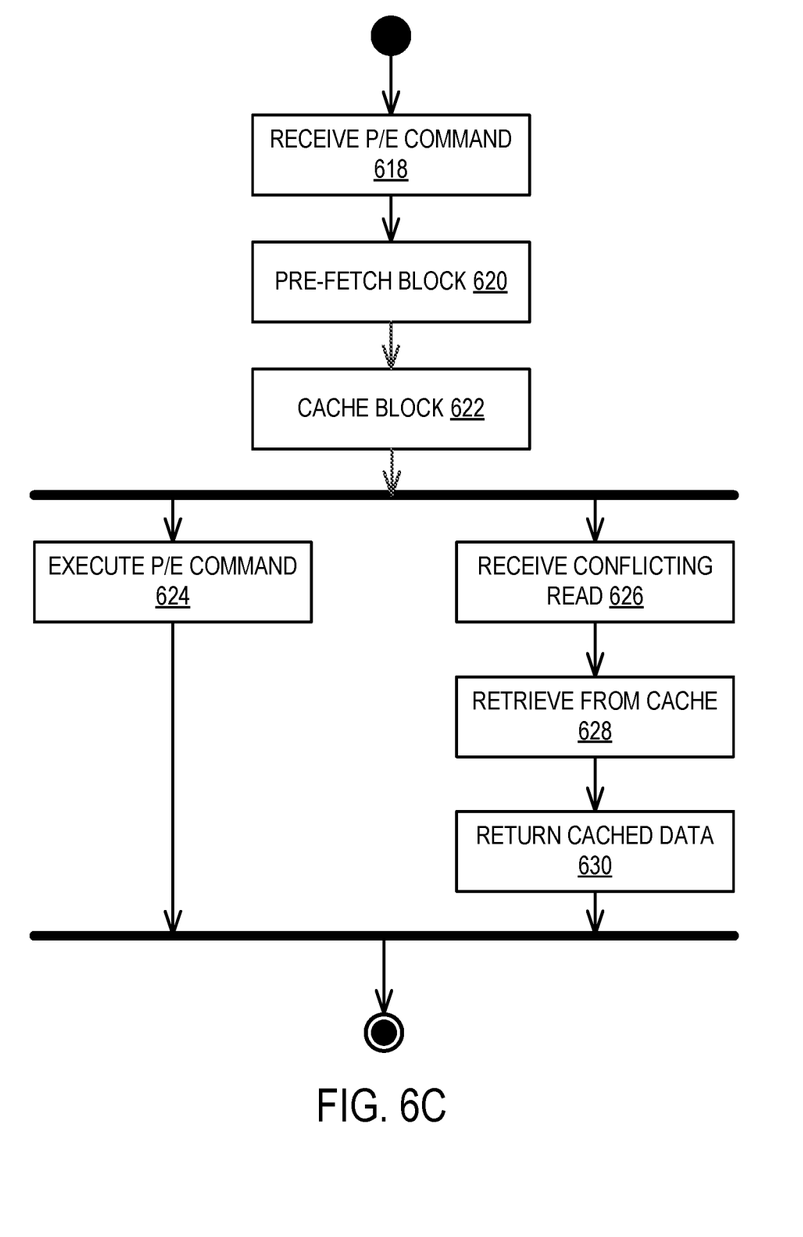
FIG. 6C is a flow diagram of a method for implementing a byte addressable read cache in local memory of a storage device according to some embodiments of the disclosure.

FIG. 6C is a flow diagram of a method for implementing a byte addressable read cache in local memory of a storage device according to some embodiments of the disclosure.

In step 618, the method receives a program or erase (P/E) command.

A P/E command instructs an SSD to write and/or erase data from a page or block, respectively, of the underlying NAND Flash array. In one embodiment, the P/E command corresponds to an update to a page of a Flash array.

In step 620, the method pre-fetches the block containing the page affected by the P/E command. In one embodiment, the method issues a read command to retrieve all pages in a given Flash block.

In step 624, the method caches the pages in the block. In one embodiment, the method caches each page by writing each page to a portion of DRAM dedicated to read cache operations. In one embodiment, the size of the read cache is only limited by the available DRAM space.

As illustrated step 624 and steps 626-630 may occur in parallel.

After caching the block affected by the P/E command, the method proceeds to execute the P/E command as usual.

While executing the command, however, a host device may issue a read to a page stored in the block undergoing programming/erasing. In existing systems, this read would be required to be buffered until the program/erase cycle was complete. In some systems, a "program suspend" function may be used to suspend the programming operation. However, this feature introduces significant complexity into the firmware of the SSD. In contrast, the method receives the conflicting read in step 626 and retrieves the corresponding page from cache in step 628. Finally, the method returns the cached data 630 to the requesting application.

As discussed above, the cache in DRAM includes all pages from the block undergoing programming and/or erasing in step 624. Thus, when the method receives the conflicting read command, the method retrieves the requested page from the read cache in DRAM. In one embodiment, a separate memory address to LBA mapping is used to map the received LBA from the P/E command to a DRAM memory address.

Figure 6D:
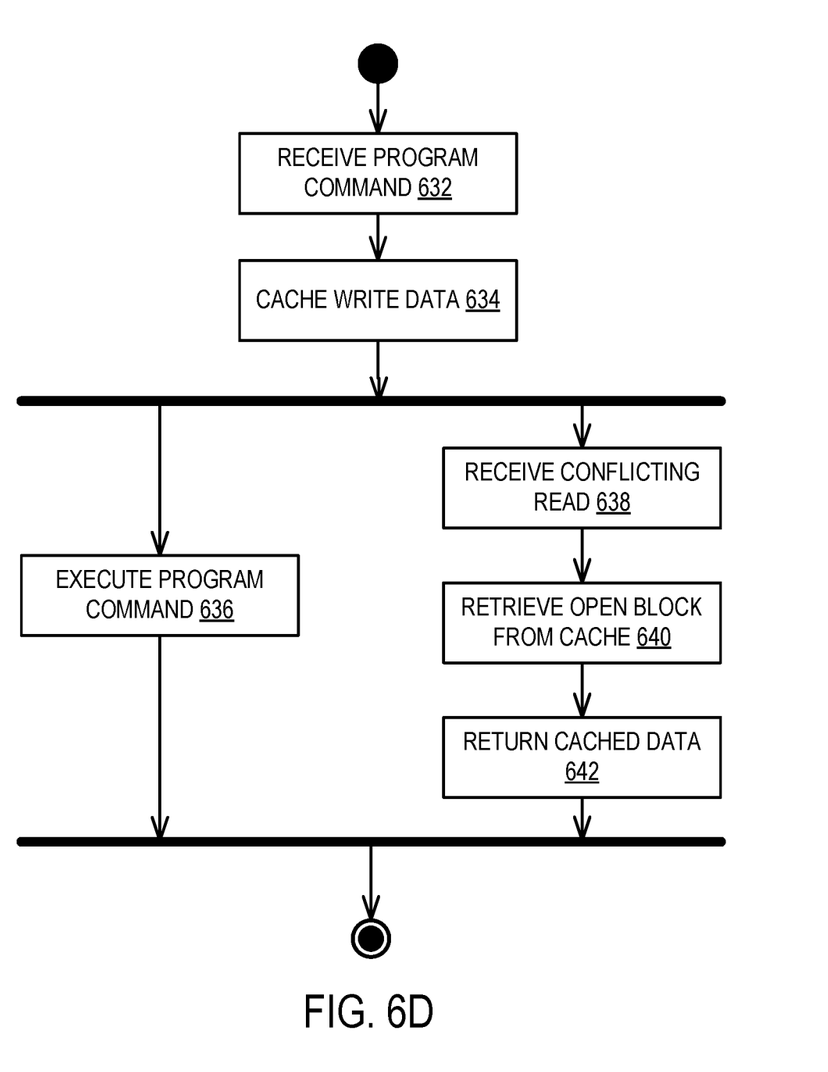
FIG. 6D is a flow diagram of an alternative method for implementing a byte addressable read cache in local memory of a storage device according to some embodiments of the disclosure.

FIG. 6D is a flow diagram of an alternative method for implementing a byte addressable read cache in local memory of a storage device according to some embodiments of the disclosure.

In step 632, the method receives a program command. In one embodiment, the program command is similar to that described in connection with FIG. 6C, the disclosure of which is incorporated herein by reference in its entirety.

In step 634, the method identifies a block associated with the page. In one embodiment, the block identifier is identified using the LBA-to-PBA mapping included in DRAM, as discussed above.

Step 636 and steps 626 may execute in parallel.

In step 636, after caching the block affected by a program command (an "open" block), the method proceeds to execute the program operation on the underlying block. During this process, in traditional SSDs, the block would be marked as "open" and all reads, writes, or other operations would be blocked from accessing the block.

In contrast, as illustrated in FIG. 6D, the method allows for the receipt of conflicting read requests in step 626. In one embodiment, a conflicting read request refers to a read of a page on a block that is opened and being programmed in step 636. Thus, in step 638, the method receives the read command. In some embodiments, the method may confirm that the page to be read is included in the open block. The method then retrieves the open block from cache in step 640. In some embodiments, the method may utilize a page offset to identify a specific memory location corresponding to the page. Finally, in step 642, the method returns the cached data in response to the read.

Figure 7:
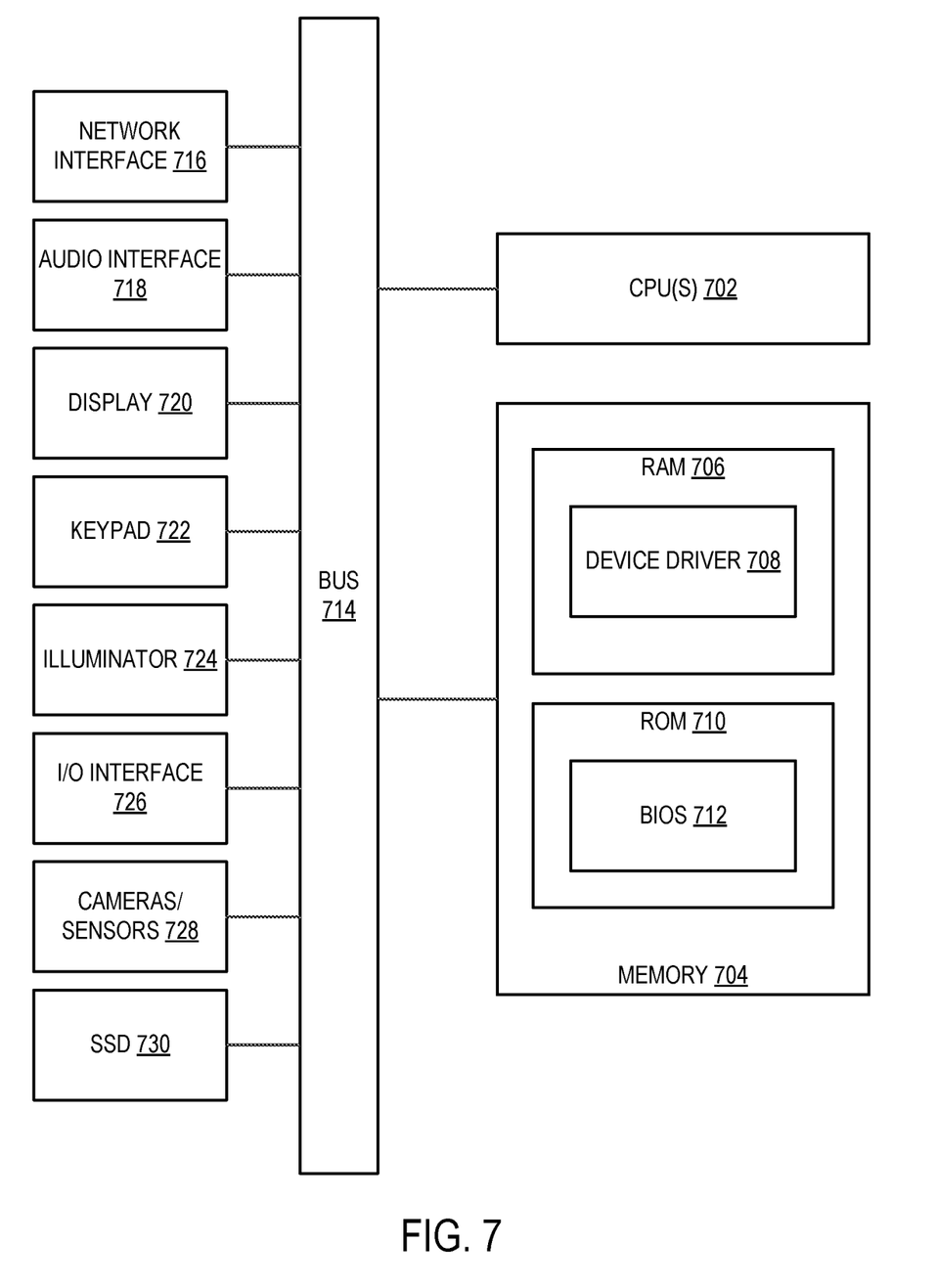
FIG. 7 is a hardware diagram illustrating a device for accessing an object storage device according to some embodiments of the disclosure.

FIG. 7 is a hardware diagram illustrating a device for accessing an object storage device according to some embodiments of the disclosure.

Client device may include many more or fewer components than those shown in FIG. 7. However, the components shown are sufficient to disclose an illustrative embodiment for implementing the present disclosure.

As shown in FIG. 7, client device includes processing units (CPUs) (702) in communication with a mass memory (704) via a bus (714). Client device also includes one or more network interfaces (716), an audio interface (718), a display (720), a keypad (722), an illuminator (724), an input/output interface (726), and a camera(s) or other optical, thermal or electromagnetic sensors (728). Client device can include one camera/sensor (728), or a plurality of cameras/sensors (728), as understood by those of skill in the art.

Client device may optionally communicate with a base station (not shown), or directly with another computing device. Network interface (716) includes circuitry for coupling client device to one or more networks and is constructed for use with one or more communication protocols and technologies. Network interface (716) is sometimes known as a transceiver, transceiving device, or network interface card (NIC).

Audio interface (718) is arranged to produce and receive audio signals such as the sound of a human voice. For example, audio interface (718) may be coupled to a speaker and microphone (not shown) to enable telecommunication with others and generate an audio acknowledgment for some action. Display (720) may be a liquid crystal display (LCD), gas plasma, light emitting diode (LED), or any other type of display used with a computing device. Display (720) may also include a touch sensitive screen arranged to receive input from an object such as a stylus or a digit from a human hand.

Keypad (722) may comprise any input device arranged to receive input from a user. For example, keypad (722) may include a push button numeric dial, or a keyboard. Keypad (722) may also include command buttons that are associated with selecting and sending images. Illuminator (724) may provide a status indication and provide light. Illuminator (724) may remain active for specific periods of time or in response to events. For example, when illuminator (724) is active, it may backlight the buttons on keypad (722) and stay on while the client device is powered. Also, illuminator (724) may backlight these buttons in various patterns when particular actions are performed, such as dialing another client device. Illuminator (724) may also cause light sources positioned within a transparent or translucent case of the client device to illuminate in response to actions.

Client device also comprises input/output interface (726) for communicating with external devices, such as UPS or switchboard devices, or other input or devices not shown in FIG. 7. Input/output interface (726) can utilize one or more communication technologies, such as USB, infrared, Bluetooth™, or the like.

Mass memory (704) includes a RAM (706), a ROM (710), and other storage means. Mass memory (704) illustrates another example of computer storage media for storage of information such as computer-readable instructions, data structures, program modules or other data. Mass memory (704) stores a basic input/output system ("BIOS") (712) for controlling low-level operation of client device. The mass memory may also store an operating system for controlling the operation of client device. It will be appreciated that this component may include a general-purpose operating system such as a version of UNIX, or LINUX™, or a specialized client communication operating system such as Windows Client™, or the Symbian® operating system. The operating system may include, or interface with a Java virtual machine module that enables control of hardware components and operating system operations via Java application programs.

Memory (704) further includes a PCIe device driver (708). As discussed above, PCIe device driver (708) issues read, write, and other commands to storage devices (not illustrated). In one embodiment, the PCIe device driver (708) issues such commands to SSD (730). In one embodiment, SSD (730) may comprise a solid-state drive or similar device that implements one or more NAND Flash chips such as the chips described in the description of FIGS. 2-3 which are incorporated by reference. In general, SSD (730) comprises any NAND Flash-based device that implements direct memory access such as that illustrated in FIGS. 2-5 and 6A-6D.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a processor, a data access command, the data access command specifying a host address of a memory to access data;
   determining, by the processor, that the data access command is a critical access command based on the content of the data access command;
   issuing, by the processor, the data access command to a controller of a storage device via a non-block datapath; and
   accessing, by the processor, a non-volatile storage component of the storage device through the non-block datapath, wherein the non-volatile storage component is mapped to the memory accessible by the processor.

2. The method of claim 1, the determining that the data access command is a critical access command comprising determining that the data access command is a critical access command based on the content of the data access command.

3. The method of claim 2, the determining that the data access command is a critical access command based on the content of the data access command comprising analyzing a payload of a write command and determining that a size of the payload is lower than a pre-determined threshold.

4. The method of claim 1, the determining that the data access command is a critical access command comprising determining that the data access command was issued via a separate system call for critical data access.

5. The method of claim 4, the determining that the data access command was issued via a separate system call for critical data access comprising analyzing a name of the separate system call.

6. The method of claim 1, the determining that the data access command is a critical access command comprising determining that a POSIX system call associated with the data access command includes a critical flag.

7. The method of claim 1, the determining that the data access command is a critical access command comprising determining that a filepath associated with the data access command is memory-mapped to a critical location of the storage device.

8. The method of claim 7, the determining that a filepath associated with the data access command is memory-mapped to a critical location of the storage device comprising determining that the filepath is mapped to a controller memory buffer (CMB) window of the storage device.

9. A device comprising:
   a processor; and
   a storage medium for tangibly storing thereon program logic for execution by the processor, the stored program logic comprising logic causing the processor to perform the operations of:
   receiving a data access command, the data access command specifying a host address of a memory to access data,
   determining that the data access command is a critical access command based on the content of the data access command,
   issuing the data access command to a controller of a storage device via a non-block datapath, and
   accessing a non-volatile storage component of the storage device through the non-block datapath, wherein the non-volatile storage component is mapped to the memory accessible by the processor.

10. The device of claim 9, the determining that the data access command is a critical access command comprising determining that the data access command is a critical access command based on the content of the data access command.

11. The device of claim 10, the determining that the data access command is a critical access command based on the content of the data access command comprising analyzing a payload of a write command and determining that a size of the payload is lower than a pre-determined threshold.

12. The device of claim 9, the determining that the data access command is a critical access command comprising determining that the data access command was issued via a separate system call for critical data access.

13. The device of claim 12, the determining that the data access command was issued via a separate system call for critical data access comprising analyzing a name of the separate system call.

14. The device of claim 9, the determining that the data access command is a critical access command comprising determining that a POSIX system call associated with the data access command includes a critical flag.

15. The device of claim 9, the determining that the data access command is a critical access command comprising determining that a filepath associated with the data access command is memory-mapped to a critical location of the storage device.

16. The device of claim 15, the determining that a filepath associated with the data access command is memory-mapped to a critical location of the storage device comprising determining that the filepath is mapped to a controller memory buffer (CMB) window of the storage device.

17. A non-transitory computer-readable storage medium for tangibly storing computer program instructions capable of being executed by a computer processor, the computer program instructions defining the steps of:

receiving, by a processor, a data access command, the data access command specifying a host address of a memory to access data;

determining, by the processor, that the data access command is a critical access command based on the content of the data access command;

issuing, by the processor, the data access command to a controller of a storage device via a non-block datapath; and accessing, by the processor, a non-volatile storage component of the storage device through the non-block datapath, wherein the non-volatile storage component is mapped to the memory accessible by the processor.

18. The non-transitory computer-readable storage medium of claim 17, the determining that the data access command is a critical access command comprising determining that the data access command is a critical access command based on the content of the data access command.

19. The non-transitory computer-readable storage medium of claim 17, the determining that the data access command is a critical access command comprising determining that the data access command was issued via a separate system call for critical data access.

20. The non-transitory computer-readable storage medium of claim 17, the determining that the data access command is a critical access command comprising determining that a filepath associated with the data access command is memory-mapped to a critical location of the storage device.

* * * * *